United States Patent Office 3,192,243
Patented June 29, 1965

3,192,243
PHOSPHOROUS DERIVATIVES OF
PENTAERYTHRITOL
John Gagliani, Wilmington, Del., assignor to Delaware
Chemicals, Inc., Wilmington, Del., a corporation of
Delaware
No Drawing. Filed Apr. 10, 1962, Ser. No. 186,361
9 Claims. (Cl. 260—461)

The present invention relates generally to improved phosphorous derivatives of pentaerythritol as well as resins containing such derivatives and possessing intumescent and other highly desirable properties and to improved methods of producing the same.

It is well known that one mol of phosphorous trihalide will react with one mol of an hydroxy compound to yield the corresponding dehalophosphite. However, the overall result of the reaction involving three or more mols of an aliphatic alcohol with phosphorous trihalide is the formation of dialykyl phosphite. Dialkyl phosphite is formed because the trialkyl ester, originally produced, is cleaved by hydrogen halide. Consequently, the preparation of these esters must be conducted under conditions which do not permit the formation of free hydrogen halide. This is normally achieved by the use of either a metal alkoxide or an appropriate amount of a tertiary base.

It is a principal object of the present invention, to provide improved organic phosphorous compositions and methods of producing the same.

Another object of the present invention is to provide phosphorous containing derivatives of pentaerythritol and resins and articles containing these derivatives and methods of producing the same.

Still another object of the present invention is to provide novel phosphorous esters of pentaerythritol and methods of producing the same.

A further object of this invention is to provide such phosphorous esters of pentaerythritol which may be used as chemical intermediates in the synthesis of many new organic phosphorous compounds.

Yet a further object of this invention is the provision of new organic phosphorous compounds for use as intumescent agents, gasoline additives which will prevent preignition; as heat and light stabilizers for vinyl and vinylidene resins; and as anti-oxidants for lubricating oils, natural rubber, synthetic rubber, among others.

The above and other objects and the scope of applicability of the present invention will become apparent from the detailed description given hereinafter. It should be understood, however, that the detailed description and specific examples, which follow, while indicating preferred embodiments of the invention, are given by way of illustration only.

The present invention may be carried out by adding phosphorous trichloride to a mixture or slurry of pentaerythritol in an inert solvent with agitation under controlled conditions of time and temperature. After the phosphorous trichloride is added, the reaction mixture is held at reaction temperature until the reaction is completed. The phosphorous ester of pentaerythritol is recovered from the reaction mixture either by removal of the volatile portion of the reaction mixture, if the ester is soluble in the reaction mixture, or by filtration, if the ester is insoluble in the reaction mixture.

The reaction of phosphorous trichloride and pentaerythritol is carried out in the presence of an inert solvent. While phosphorous trichloride is advantageously employed the other phosphorous trihalides may be used. The pentaerythritol used may be either monopentaerythritol or technical pentaerythritol (containing approximately seventy to ninety percent monopentaerythritol and ten to thirty percent other pentaerythritols). Such inert solvents as benzene, toluene, xylene, ethylene dichloride, carbon tetrachloride, etc. may be used in the present process, organic solvents such as the alcohols and aldehydes being avoided.

Phosphorous trichloride is added to the slurry of pentaerythritol in an inert solvent during a time period of between 10 minutes and 120 minutes the free hydrogen chloride being removed as it is evolved. A limiting factor to the time of addition of the phosphorous trichloride is the ability to remove from the reaction mixture the free hydrogen chloride formed during the reaction and it may be necessary to extend the time of addition beyond 120 minutes. The reaction may be effected at temperatures of between 0° C. and 100° C.; preferably between 10°–40° C. during the initial stages of the reaction i.e. during the addition of the phosphorous trihalide and between 70°–100° C. during the remainder of the reaction. The time of reaction may vary between ½ hour and 8 hours; preferably between 1 hour and 3 hours.

Depending on the type of phosphorous ester of pentaerythritol desired, the mol ratio of phosphorous trichloride to pentaerythritol may vary between 1:1 to 6:1. At ratios of 2:1 or lower, the cyclic-bis-acid phosphites are formed. At ratios greater than 2:1 the reaction follows the more normal mechanism and the chloro-phosphites are obtained. Best results for the synthesis of the cyclic-bis-chlorophosphite are obtained at ratios of between 4:1 and 6:1.

Other novel and useful compounds have been produced by reacting the cyclic-bis-chlorophosphite containing material with reactive compounds such as amines, for example, aniline, and hydroxy compounds, for example, phenol and substituted phenols. The above compounds may be advantageously employed as a comonomer in the production of improved polymeric resins of intumescent character and possessing good color and color retention properties.

The detailed descriptions of the invention given below, although representing the preferred embodiments of the invention, are given by way of illustration only and do not necessarily limit the scope of the invention. Various changes or modifications within the descriptions and examples may become apparent to those skilled in the art after having familiarized themselves with the details obtained herein.

Example 1

Charge to a two liter round bottom three neck flask, equipped with a thermometer, condenser and stirrer, 136 grams of pentaerythritol (1 mol) and 136 grams of benzene. With agitation, add 685 grams of phosphorous trichloride (5 mols) slowly and continuously in 25 minutes, allowing the reaction temperature to rise from 18° C. at the beginning of the addition to 30° C. at the end of the addition. After all the phosphorous trichloride has been added, heat the reaction mixture to 50° C. in 45 minutes and hold at 50° C. for one hour. Then heat the reaction mixture to reflux temperature, 80° C., in 45 minutes and hold at reflux temperature for 3 hours.

The reaction mixture is heated to 100° C., allowing the volatile material to distill off. Distillation is continued at a reduced pressure of 75 mm. at a pot temperature of 100° C. until all volatiles have been removed. 250 grams of crude pentaerythritol bischlorophosphite is obtained as a yellow semi-solid having the following analysis:

|  | Theory | Found |
|---|---|---|
| Carbon | 22.6 | 23.58 |
| Hydrogen | 3.02 | 3.52 |
| Chlorine | 26.8 | 24.2 |
| Phosphorous | 23.4 | 23.0 |

The formula of pentaerythritol bischlorophosphite is:

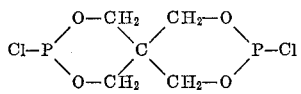

Example 2

There was charged to a five liter round bottom three neck flask, equipped with a thermometer, condenser, and stirred 408 grams of pentaaerylthritol (3 mols) and 620 grams of benzene with agitation, there was added 620 grams of of phosphorous trichloride (4.5 mols) slowly and continuously in 30 minutes allowing the temperature to rise from 18° C. to 30° C. during the addition. After all the phosphorous trichloride was added, the reaction mixture was heated to 50° C. in 45 minutes and held at 50° C. for one hour. Then the reaction mixture was heated to reflux temperature, 80° C., in 1 hour and held at reflux temperature for 3 hours. During refluxing, a white crystalline product began to form. Strong agitation was required to prevent local overheating. Here, if necessary, additional benzene may be added. The reaction mixture was cooled to 20° C. and filtered. The precipitate was washed with additional quantities of fresh benzene until it was free of chlorides The product was dried at 50–60° C. for 3 hours. 400 grams of pentaerythritol bis acid phosphite were obtained as a white crystalline solid having a melting point of 250–255° C. with the following analysis:

|  | Theory | Found |
| --- | --- | --- |
| Carbon | 26.30 | 32.84 |
| Hydrogen | 4.38 | 5.29 |
| Chlorine | 0 | 0.7 |
| Phosphorus | 27.0 | 26 0 |

The structural formula of pentaerythritol bis acid phosphite is:

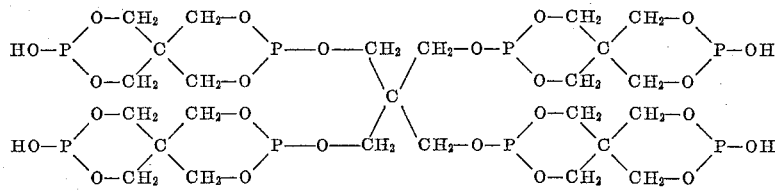

Additional procedures were followed employing different proportions of pentaerythritol and PCl₃ with the following results:

| Mol Ratio (Pentaerythritol:PCl₃) | Product | Percent Chlorine | | Percent Phosphorus | |
| --- | --- | --- | --- | --- | --- |
| | | Found | Theory | Found | Theory |
| (a) 1:1.5 | Acid Phosphite | 0.05 | 0.00 | 26.0 | 27.0 |
| (b) 1:2.0 | do | 0.7 | 0.00 | 26.1 | 27.0 |
| (c) 1:3.0 | Chloro Phosphite | 20.0 | 26.8 | 22.0 | 23.4 |
| (d) 1:4.0 | do | 23.3 | 26.8 | 22.8 | 23.4 |
| (e) 1:5.0 | do | 24.2 | 26.8 | 23.0 | 23.4 |
| (f) 1:6.0 | do | 22.9 | 26.8 | 24.5 | 23.4 |

It will be noted that procedure $a$ gave the best acid phosphite and procedure $e$ gave the best chloro phosphite.

Example 3

(A) The product obtained in Example 1 was dissolved in 300 grams of benzene at 70–75° C. To this solution at 75° C. was added slowly and continuously in a one hour period, a solution of 188 grams (2 mols) of phenol in 400 grams of benzene. The hydrogen chloride was removed as fast as it was formed by maintaining a slight vacuum in the reaction vessel. After all the benzene solution of phenol had been added, the benzene and other volatile materials were removed by heating the reaction mixture to 150° C. at 50 mm. pressure. 373 grams of a white solid diphenyl pentaerythritol diphosphite was obtained having the following analysis:

|  | Theory | Found |
| --- | --- | --- |
| Carbon | 54.9 | 53.0 |
| Hydrogen | 4.56 | 4.89 |
| Phosphorus | 15.7 | 14 5 |

Diphenyl pentaerythritol diphosphite has the following structural formula:

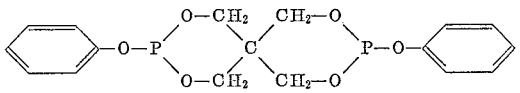

Example 4

88.5 grams of pentaerythritol bischlorophosphite produced in Example 1 were dissolved in 200 grams of benzene. The solution was heated to reflux, approximately 75° C. With agitation 152 grams of bisphenol A (4,4'-isopropylidenediphenol) was added slowly and continuously in 1½ hours. The hydrogen chloride was removed as fast as it was formed by sparging the reaction mixture with nitrogen. After all the bisphenol A has been added, 300 grams of benzene were added and the reaction mixture refluxed for 3 hours, maintaining a slight sparge of nitrogen to help remove any hydrogen chloride formed. The reaction mixture was cooled to 15° C. and filtered. The precipitate was washed with fresh benzene and dried in an oven. A white crystalline product Di (p' isopropylidenephenol) phenyl pentaerythritol diphosphite was obtained having the following analysis:

|  | Theory | Found |
| --- | --- | --- |
| Carbon | 62.3 | 62.7 |
| Hydrogen | 5.79 | 6.28 |
| Phosphorous | 9.41 | 8.5 |
| Melting Point, °C |  | 143–150 |

The structural formula of Di (p,p'isopropylidenephenol) phenyl pentaerythritol diphosphite is as follows:

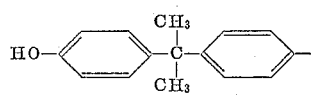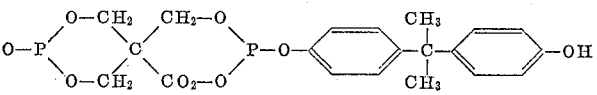

Example 5

88.5 grams of pentaerythritol bischlorophosphite produced in Example 1 was dissolved in 200 grams of benzene. The solution was cooled to 20° C. and added slowly and continuously in 2 hours to a solution of 124 grams of aniline in 124 grams of benzene. Continuous cooling was necessary to maintain a temperature of 20° C. due to the heat of reaction. After the benzene solution of aniline had been added, the reaction mixture was heated to 70° C. and held at 70° C. for 2 hours. It was then cooled to 25° C. and filtered to remove the aniline hydrochloride formed. The filtrate was heated to 130° C. at 50 mm. pressure. The residue was dissolved in benzene and filtered to remove any additional quantities of aniline hydrochloride. The filtrate was again heated to 130° C. at 50 mm. pressure. 106 grams of a slightly yellow residue of pentaerythritol bisphosphorous phenylamide was obtained having the following analysis:

|  | Theory | Found |
|---|---|---|
| Carbon | 52.8 | 53.6 |
| Hydrogen | 5.44 | 5.36 |
| Phosphorous | 16.85 | 17.0 |
| Nitrogen | 7.6 | 7.09 |

The structural formula of pentaerythritol bisphosphorous phenyl amide is as follows:

Example 6

The procedure of Example 3 was followed using the molal equivalent of para tertiary butyl phenol in place of phenol to produce the phosphite ester, a white solid with a melting point of 208–214° C. and having the structural formula:

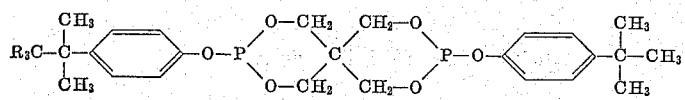

Example 7

The procedure of Example 3 was followed using the molal equivalent of ortho cresol in place of phenol to produce the ester, a yellow solid with a melting point of 54–56° C. and having the structural formula:

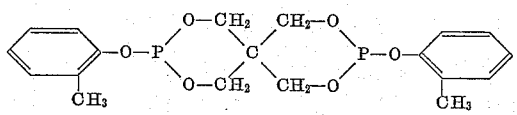

Other compounds may be reacted with the cyclic-bis-chlorophosphite material to produce the corresponding derivatives thereof. For example, in Example 3 the phenol may be replaced in whole or in part by phenol substituted in one or more positions, for example, phenols which are substituted in the ring by hydroxy, alkyl, aryl, alkylaryl, arylalkyl or other radicals to produce a structure.

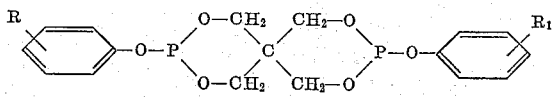

wherein R and $R_1$ are substituents as above indicated.

Example 8

There were charged to one liter, round bottom, three neck flask equipped with a thermometer, condenser and stirrer, 360 grams of diallylidene pentaerythritol and the reaction mixture then heated to 55° C. With stirring there was added 76.7 grams of pentaerythritol (88% monopentaerythritol and 12% dipentaerythritol), 25.6 grams of ethylene glycol and 2.64 grams of 75% phosphoric acid. The reaction mixture was heated to 140° C. and held at 140° C.±5° C. for two hours to produce an A stage resin.

52.5 grams of the A stage resin, 1.5 grams of di (p,p'-isopropylidenephenol) phenyl pentaerythritol diphosphite (produced as described above) and 10.5 grams of a 5% solution of diethyl sulfate in acetone were dissolved in 25 grams of acetone. The solution was heated to 80° C.–85° C. at atmospheric pressure, allowing the acetone to distill off. The solution was held at 80° C.–85° C. for one hour and then evacuated to remove the final portions of acetone.

The resulting resin is self-extinguishing whereas the same resin in the absence of the phosphite is extremely flammable.

Example 9

53.5 grams of the A stage resin produced in Example 8, 2.7 grams of diphenyl pentaerythritol diphosphite produced as above, and 10.5 grams of a 5% solution of diethyl sulfate in acetone were dissolved in 25 grams of acetone. The solution is heated at atmospheric pressure to 80–85° C., allowing the acetone to distill off. The solution was held at 80–85° C. for one hour and then evacuated to remove the residual portions of acetone.

Again the resulting resin is self-extinguishing whereas the same resin without the phosphite is extremely flammable.

Example 10

5 grams of pentaerythritol bis acid phosphite produced in accordance with Example 3 were dissolved in 95 grams of water (ethyl alcohol may be used in place of water). Paper saturated with this solution and then dried at 50° C. to 90° C. is self-extinguishing. The chemical pick-up on the paper was approximately 0.1% based on the weight of the dried paper.

Example 11

53 grams of the A stage resin produced as in Example 8 and 8 grams of a 5% solution of diethyl sulfate in acetone were dissolved in 30 grams of acetone. The solution was heated to 80–85° C. and held at 80–85° C. for one hour. 0.3 gram of pentaerythritol bischlorophosphite were added and the solution held at 80–85° C. for an additional hour. Films produced from the resulting resin have improved color and color retention as compared with the same films not containing the phosphite.

While there have been described preferred embodiments of the present invention, it is apparent that numerous alterations, omissions and additions may be made without departing from the spirit thereof.

What is claimed is:

1. Pentaerythritol tetra acid phosphite of the formula

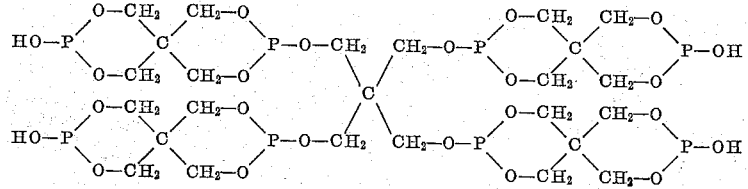

2. Di (p,p'-isopropylidenephenol) phenyl pentaerythritol diphosphite of the formula

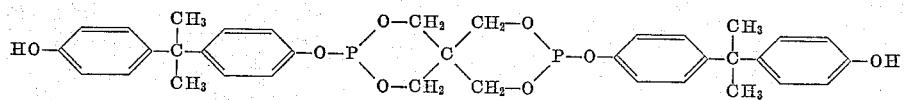

3. Pentaerythritol bisphosphorous-phenylamide of the formula

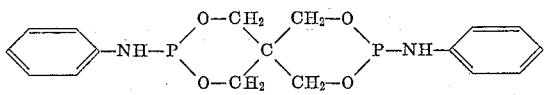

4. In a method of producing organic phosphorus compounds consisting of pentaerythritol poly acid phosphites and derivatives thereof, the steps comprising reacting pentaerythritol and phosphorous trihalide in an inert solvent with the formation of hydrogen halide, removing said hydrogen halide during the said formation thereof and recovering the resulting pentaerythritol poly acid phosphite as a crystalline solid with a melting point of over 200° C. and a chlorine content of less than 2%.

5. In a method of producing organic phosphorus compounds consisting of pentaerythritol poly acid phosphites and derivatives thereof, the steps comprising reacting pentaerythritol and phosphorous trichloride in an inert solvent with the evolution of hydrogen chloride, removing said hydrogen chloride, the mol ratio of phosphorous trichloride to pentaerythritol being between 1.5:1 and 2:1 during said evolution thereof and recovering the resulting organic phosphorous compounds as a crystalline solid with a melting point over 200° C. and a chlorine content of less than 2%.

6. The method of claim 5 wherein said phosphorous trichloride is slowly added to said mixture of said pentaerythritol and said solvent.

7. The method of claim 5 wherein the mol ratio of phosphorous trichloride to pentaerythritol does not exceed about 2:1.

8. The method of claim 6 wherein said mixture is maintained at a temperature between 10° C. and 100° C. during the addition of said phosphorous trichloride.

9. The method of claim 6 wherein the temperature of said mixture is maintained between 70° C. and 100° C. following the addition of said phosphorous trichloride for a time sufficient to effect the precipitation of said pentaerythritol poly acid phosphite.

References Cited by the Examiner

UNITED STATES PATENTS

| | | | |
|---|---|---|---|
| 2,661,366 | 12/53 | Gamrath et al. | 260—461 |
| 2,847,443 | 8/58 | Hechenbleikner et al. | 260—461 |
| 2,957,856 | 10/60 | Guest et al. | 260—461 |
| 2,961,454 | 11/60 | Gould et al. | 260—461 |

OTHER REFERENCES

Lucas et al.: "J. Am. Chem. Soc.," vol. 72, December 1950, pages 5491–5497.

CHARLES B. PARKER, *Primary Examiner.*

MORRIS LIEBMAN, *Examiner.*